(12) United States Patent
Maes

(10) Patent No.: US 6,971,011 B1
(45) Date of Patent: Nov. 29, 2005

(54) WATERMARK DETECTION

(75) Inventor: Maurice J. J. J-B. Maes, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/423,279

(22) PCT Filed: Feb. 18, 1999

(86) PCT No.: PCT/IB99/00293

§ 371 (c)(1),
(2), (4) Date: Nov. 4, 1999

(87) PCT Pub. No.: WO99/45704

PCT Pub. Date: Sep. 10, 1999

(30) Foreign Application Priority Data

Mar. 4, 1998 (EP) .................................. 98200656

(51) Int. Cl.[7] .......................... H04L 9/00; H04N 7/167
(52) U.S. Cl. ...................... 713/176; 380/217; 725/31
(58) Field of Search .................. 382/100, 282, 382/200, 283; 713/176, 168, 177, 181, 502; 380/202, 210, 236, 42, 54, 201, 216, 217, 380/200; 370/476; 725/31

(56) References Cited

U.S. PATENT DOCUMENTS

| | | | | |
|---|---|---|---|---|
| 3,573,350 A | * | 4/1971 | Rhee .............................. | 386/1 |
| 4,370,732 A | * | 1/1983 | Kogge ............................ | 711/5 |
| 5,319,735 A | * | 6/1994 | Preuss et al. ................. | 704/205 |
| 5,574,787 A | * | 11/1996 | Ryan ............................. | 380/201 |
| 5,915,027 A | * | 6/1999 | Cox et al. ...................... | 380/54 |
| 5,933,431 A | * | 8/1999 | Ko ................................. | 370/476 |
| 6,047,317 A | * | 4/2000 | Bisdikian et al. ............. | 725/142 |
| 6,108,434 A | * | 8/2000 | Cox et al. ..................... | 382/100 |
| 6,131,161 A | * | 10/2000 | Linnartz ....................... | 713/176 |
| 6,185,312 B1 | * | 2/2001 | Nakamura et al. .......... | 382/100 |
| 6,208,745 B1 | * | 3/2001 | Florencio et al. ............ | 382/100 |
| 6,219,837 B1 | * | 4/2001 | Yeo et al. ..................... | 725/38 |
| 6,373,960 B1 | * | 4/2002 | Conover et al. ............. | 382/100 |

OTHER PUBLICATIONS

Hoffman, et al., RFC 2038, "RTP Payload Formal for MPEG1/MPEG2 Video," 1996.*
United States 47 CFR 73.1201, "Station Identification", 1991 Revision.*
Kalker et al., "On the Reloability of Detecting Electronic Watermarks in Digital Images", Proceddings of Eusipco 1998.

* cited by examiner

Primary Examiner—Gregory Morse
Assistant Examiner—Matthew Heneghan
(74) Attorney, Agent, or Firm—Gregory L. Thorne

(57) ABSTRACT

Method of detecting a watermark embedded in a signal (S), in which a plurality of frames of the signal (S) is combined to a detection set (Dj) for one detection event. According to the invention, the reliability of watermark detection is enhanced by using non-consecutive frames to form the detection set (Dj). The invention also relates to an apparatus (2) for recording and/or playback of a signal, and to a system for broadcast monitoring, comprising such a watermark detector (24).

20 Claims, 1 Drawing Sheet

WATERMARK DETECTION

BACKGROUND OF THE INVENTION

The invention relates to a method and a device for detecting a watermark embedded in a signal in which method a plurality of frames of the signal is combined to a detection set for one detection event.

The invention also relates to an apparatus for recording and/or playback of a signal and to a system for monitoring a broadcast signal.

Watermarks are imperceptible or hardly perceptible marks embedded in a signal such as audio, still pictures, animations, video, etc. They are embedded in the signal in such a way that they are difficult to remove. A watermark may comprise additional information such as, for example, information about the source or the copyright status of documents or audiovisual programs. Watermarks allow tracing of piracy and support the protection of intellectual property.

A known method of detecting a watermark comprises a correlation step for correlating the signal with locally stored watermarks. The result of such a correlation is subsequently evaluated. When the correlation of the signal with a given watermark is, for example, larger than a given threshold value, this watermark may be considered to be the watermark embedded in the signal. A correlation with many different watermarks may also be performed, with the watermark having the highest correlation being considered as the watermark that has been used.

Since the signal may be subjected to various signal operations such as MPEG compression, DA/AD conversion, NTSC/PAL conversion, as well as cropping and scaling, a detection based on single frames is often unreliable in the sense that it leads to many missed detections. The article "On the Reliability of Detecting Electronic Watermarks in Digital Images" by A. A. C. Kalker, G. F. C. Depovere and J. P. M. Linnartz, published in the *Proceedings of Eusipco* 1998 (Rhodes, Greece) gives a plausible explanation for the fact that the combination of a plurality of frames, for example n, to a detection set enhances the reliability of the detection process by a factor of $\sqrt{n}$. However, this applies only to n uncorrelated frames. It is common practice to combine consecutive frames. However, these are generally highly correlated.

SUMMARY OF THE INVENTION

It is an object of the invention to enhance the reliability of detecting a watermark.

To this end, the invention is characterized in that, for forming the detection set, at least one frame is used which does not immediately follow an other frame in the signal, which other frame is also used for the detection set. The use of frames for a detection set other than only consecutive frames has the advantage that it enhances the reliability of detecting a watermark. The reason is that frames which are mutually further apart are generally less correlated. When using less correlated frames, the enhancement of the reliability as applies to uncorrelated frames, namely the reliability of the detection process increasing by a factor of $\sqrt{n}$, is better approximated. The use of frames, not all of which occur consecutively in the signal, is referred to as interleaving.

In an embodiment, the method is characterized in that a predetermined number of frames is used for the detection set, which frames are present in the signal at a mutually predetermined distance corresponding to an integral number of frames. This uniform mode of selecting frames for a detection set is a method which is easily applicable.

In a further embodiment, the predetermined number of frames and the predetermined distance are chosen to be such that their greatest common divisor equals one. In this case, a uniform distribution of I, B and P frames across the various detection sets is achieved for an MPEG signal.

A diagonal interleaving technique is presented that is particularly well suited for an MPEG signal. Also in this case, a uniform distribution of I, B and P frames across the various detection sets is achieved.

Further embodiments relate to an apparatus for recording and/or playback of a signal, comprising a device for detecting a watermark according to the invention, and to a system for monitoring a broadcast signal, comprising such a device.

These and other aspects are apparent from and will be elucidated, by way of non-limitative example, with reference to the embodiment(s) described hereinafter.

Both Figures only show the elements of the device in so far as is necessary for understanding the invention.

DETAILED DESCRIPTION OF THE PREFERRED EMBODIMENTS

Figure 1:
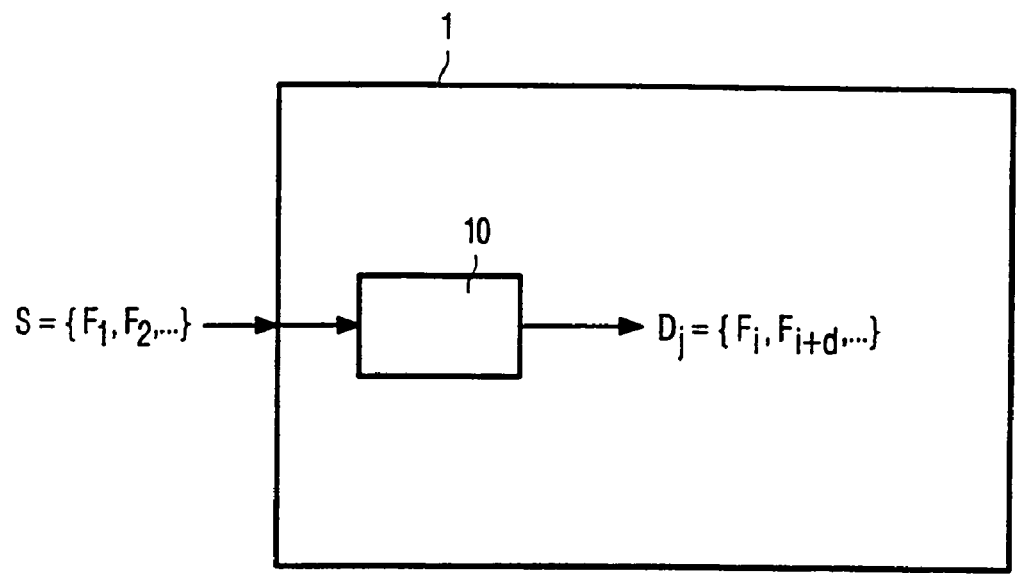
FIG. 1 shows an embodiment of a device according to the invention.

FIG. 1 shows a device 1 for detecting a watermark according to the invention, comprising means 10 for combining a plurality of frames $\{F_1, F_2, \ldots\}$ of a signal S to a detection set $D_j$ for one detection event.

According to the invention, at least one frame $F_{i+d}$ for forming the detection set is used, which frame does not immediately follow another frame $F_i$, also used for the detection set, in the signal S. One or more intermediate frames are skipped in this way and used for, for example, another detection set. An advantage of using frames $\{F_i, F_{i+d}, \ldots\}$, not all of which are consecutive, is that the frames are mutually less correlated, thus enhancing the reliability of detecting a watermark.

Let it be assumed that a number of n frames $\{F_i, F_{i+d}, \ldots\}$ is used for a detection set $D_j$. If all consecutive frames $\{F_1, F_2, \ldots\}$ are used as is already known, the first decision moment occurs after n frames. A consequence of using n frames $\{F_i, F_{i+d}, \ldots\}$, not all of which are consecutive, is that the decision occurs at a later moment.

The combination of frames $\{F_i, F_{i+d}, \ldots\}$, not all of which are consecutively present in the signal S, may of course be effected in many different ways. Two interleaving schemes are discussed by way of example. Within the scope of the invention, it is possible to use different schemes yielding comparable results.

The first scheme to be discussed is uniform interleaving. In this form of interleaving, the shortest distance between two frames $\{F_i, F_{i+d}, \ldots\}$ used for the detection set $D_j$ is equal to a constant value d in the signal, corresponding to an integral number of frames of the signal. This may be expressed as follows $$F_i \in D_j \Leftrightarrow i \equiv j \pmod{d}$$

A total number of frames $\{F_1, F_2, \ldots\}$ equal to d times n is assigned to a number of detection sets $D_j$ equal to d. As an example, the detection sets $D_j$ are shown below with a number of frames n=12 and a mutual distance d=5.

$D_1 = \{F_1, F_6, F_{11}, F_{16}, F_{21}, F_{26}, F_{31}, F_{36}, F_{41}, F_{46}, F_{51}, F_{56}\}$,
$D_2 = \{F_2, F_7, F_{12}, F_{17}, F_{22}, F_{27}, F_{32}, F_{37}, F_{42}, F_{47}, F_{52}, F_{57}\}$,
$D_3 = \{F_3, F_8, F_{13}, F_{18}, F_{23}, F_{28}, F_{33}, F_{38}, F_{43}, F_{48}, F_{53}, F_{58}\}$,
$D_4 = \{F_4, F_9, F_{14}, F_{19}, F_{24}, F_{29}, F_{34}, F_{39}, F_{44}, F_{49}, F_{54}, F_{59}\}$,
$D_5 = \{F_5, F_{10}, F_{15}, F_{20}, F_{25}, F_{30}, F_{35}, F_{40}, F_{45}, F_{50}, F_{55}, F_{60}\}$

For the sake of clarity, this distribution is illustrated with reference to Table I. Table I shows the numbers of the frames $\{F_1, F_2, \ldots\}$ consecutively, as occur in the signal S

TABLE I

Illustration of uniform interleaving, n = 12, d = 5.

| 1 | 2 | 3 | 4 | 5 | 6 | 7 | 8 | 9 | 10 | 11 | 12 |
|---|---|---|---|---|---|---|---|---|----|----|----|
| 13 | _14_ | 15 | 16 | 17 | 18 | _19_ | 20 | 21 | 22 | 23 | _24_ |
| 25 | 26 | 27 | 28 | _29_ | 30 | 31 | 32 | 33 | _34_ | 35 | 36 |
| 37 | 38 | _39_ | 40 | 41 | 42 | 43 | _44_ | 45 | 46 | 47 | 48 |
| _49_ | 50 | 51 | 52 | 53 | _54_ | 55 | 56 | 57 | 58 | _59_ | 60 |

Table I: Illustration of uniform interleaving, n=12, d=5.

The consecutive frames $\{F_1, F_2, \ldots\}$ of the signal S are shown as d series of n frames. This does not need to be a physical separation of the frames $\{F_1, F_2, \ldots\}$ of the signal, although this is possible, but may also be considered to be a conceptual notion so as to elucidate the invention. The different fonts indicate that the frames $\{F_1, F_2, \ldots\}$ are used in different detection sets $D_j$. A detection set $D_j$ comprises frames $\{F_i, F_{i+d}, \ldots\}$ with the numbers indicated by the same font in Table I. With this form of interleaving, the first detection decision takes place after d(n−1)+1 frames. The process is repeated after dn frames.

It is important for many applications that the watermark survives a compression such as, for example, MPEG. The different frames in an MPEG signal: I, B and P frames may behave differently as regards survival of a watermark. When using uniform interleaving, there may be a problem for some values of n and d. For the purpose of illustration, an example is given with n=12 which, in this case, is also a Group of Picture (GOP) size of an MPEG signal S. The distance between the frames is d=4. The distribution of the frames $\{F_i, F_{i+d}, \ldots\}$ is shown in Table II.

TABLE II

Illustration of uniform interleaving, n = 12, d = 4 at MPEG.

| I | B | B | P | B | B | P | B | B | P | B | B |
|---|---|---|---|---|---|---|---|---|---|---|---|
| 1 | 2 | 3 | _4_ | 5 | 6 | 7 | _8_ | 9 | 10 | 11 | _12_ |
| 13 | 14 | 15 | _16_ | 17 | 18 | 19 | _20_ | 21 | 22 | 23 | _24_ |
| 25 | 26 | 27 | _28_ | 29 | 30 | 31 | _32_ | 33 | 34 | 35 | _36_ |
| 37 | 38 | 39 | _40_ | 41 | 42 | 43 | _44_ | 45 | 46 | 47 | _48_ |

Table II: Illustration of uniform interleaving, n=12, d=4 at MPEG.

As is evident from Table II, the different detection sets $D_j$ comprise a non-uniform distribution of MPEG frames. For example, all I frames occur in one detection set $D_j$. Solutions within the scope of the invention are possible for a more uniform distribution of I, B and P frames across the detection sets $D_j$.

When using uniform interleaving, it is, for example, possible to choose n and d in such a way that their greatest common divisor equals one. This is, for example, the case for n=12 and d=5, as already discussed hereinbefore. See Table III.

TABLE III

Illustration of uniform interleaving, n = 12, d = 5 at MPEG.

| I | B | B | P | B | B | P | B | B | P | B | B |
|---|---|---|---|---|---|---|---|---|---|---|---|
| 1 | 2 | 3 | 4 | 5 | 6 | 7 | 8 | 9 | 10 | 11 | 12 |
| 13 | _14_ | 15 | 16 | 17 | 18 | _19_ | 20 | 21 | 22 | 23 | _24_ |
| 25 | 26 | 27 | 28 | _29_ | 30 | 31 | 32 | 33 | _34_ | 35 | 36 |
| 37 | 38 | _39_ | 40 | 41 | 42 | 43 | _44_ | 45 | 46 | 47 | 48 |
| _49_ | 50 | 51 | 52 | 53 | _54_ | 55 | 56 | 57 | 58 | _59_ | 60 |

Table III: Illustration of uniform interleaving, n=12, d=5 at MPEG.

It can clearly be seen that each detection set $D_j$ comprises a frame from each column. This means that each type of frame occurs in each detection set $D_j$.

It is further possible, for example, to make the uniform interval more flexible. This may be effected, for example, by means of diagonal interleaving. With n being an integral number of times a GOP size of an MPEG signal S, a uniform distribution of I, B and P frames is achieved with the expression for diagonal interleaving, which may be defined as follows:

$F_i \in D_j$ $\Leftrightarrow$ $i \equiv 1+(j-1)n+m(n+1) \pmod{dn}$ voor $m \in \{0, 1, \ldots, n-1\}$ For n=12 and d=5, the following detection sets $D_j$ are obtained.

$D_1 = \{F_1, F_6, F_{11}, F_{14}, F_{19}, F_{24}, F_{27}, F_{32}, F_{40}, F_{45}, F_{53}, F_{58}\}$,
$D_2 = \{F_5, F_{10}, F_{13}, F_{18}, F_{23}, F_{26}, F_{31}, F_{36}, F_{44}, F_{47}, F_{52}, F_{57}\}$,
$D_3 = \{F_4, F_9, F_{17}, F_{22}, F_{25}, F_{30}, F_{35}, F_{38}, F_{43}, F_{48}, F_{51}, F_{56}\}$,
$D_4 = \{F_3, F_8, F_{16}, F_{21}, F_{29}, F_{34}, F_{37}, F_{42}, F_{47}, F_{50}, F_{55}, F_{60}\}$,
$D_5 = \{F_2, F_7, F_{12}, F_{15}, F_{20}, F_{28}, F_{33}, F_{41}, F_{46}, F_{49}, F_{54}, F_{59}\}$

The distribution of the frames $\{F_i, F_{i+d}, \ldots\}$ is shown in Table IV.

TABLE IV

Illustration of diagonal interviewing, n = 12, d = 5.

| I | B | B | P | B | B | P | B | B | P | B | B |
|---|---|---|---|---|---|---|---|---|---|---|---|
| 1 | 2 | 3 | _4_ | 5 | 6 | 7 | 8 | _9_ | 10 | 11 | 12 |
| 13 | 14 | 15 | 16 | _17_ | 18 | 19 | 20 | 21 | _22_ | 23 | 24 |
| _25_ | 26 | 27 | 28 | 29 | _30_ | 31 | 32 | 33 | 34 | _35_ | 36 |
| 37 | _38_ | 39 | 40 | 41 | 42 | _43_ | 44 | 45 | 46 | 47 | _48_ |
| 49 | 50 | _51_ | 52 | 53 | 54 | 55 | _56_ | 57 | 58 | 59 | 60 |

Table IV: Illustration of diagonal interleaving, n=12, d=5.

As already explained hereinbefore, the consecutive frames $\{F_1, F_2, \ldots\}$ of the signal S are shown as d series of n frames. The number of frames per series is equal to the number of frames in a detection set, namely n. In this case, this number is further equal to an integral number of times the GOP size of an MPEG signal S. It is evident from Table IV that the position in the signal S of a frame $F_i$ used in a detection set $D_j$ shifts in each subsequent series by one position with respect to the start of the series. With respect to this frame $F_i$, which is here referred to as reference frame for the sake of simplicity, the other frames $F_{i+d}$ for the same detection set $D_j$ are present in the same series at a distance which is equal to an integral number of times the number of series d. It may be noted that the average and most frequently occurring distance between the frames $\{F_i, F_{i+d}, \ldots\}$ in a detection set $D_j$ equals d= 5, alternated by other distances such as 3 and 8 in this example.

Figure 2:
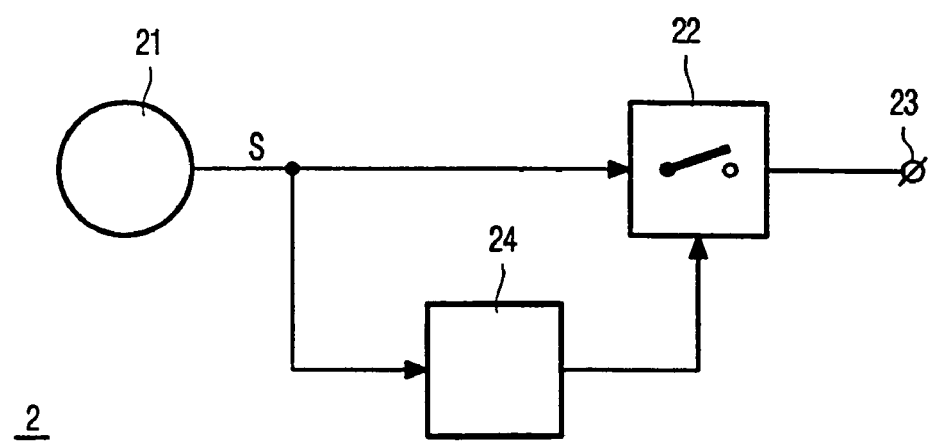
FIG. 2 shows an embodiment of an apparatus comprising a device for detecting a watermark according to the invention.

FIG. 2 shows an apparatus, for example a DVD player 2, comprising means 21 for reading a DVD disc so as to obtain a DVD signal S. The DVD signal S is an MPEG bit stream which is stored on the DVD disc. The DVD signal S is applied from an output 23 of the DVD player 2 via a switch 22. The output 23 is connected to an external MPEG decoder and a picture display device (not shown). For, for example, copyright protection it is assumed that the DVD player 2 cannot play video signals S with a predetermined watermark, unless other conditions are met which are not important for the invention. Watermarked signals S may be played back only when, for example, the disc comprises a given "wobble" key. To be able to detect a watermark, the DVD player 2 comprises a watermark detector 24 which is adapted as described with reference to FIG. 1. The watermark detector 24 receives the stored signal S and controls the switch 22 in dependence upon the detected watermark.

The invention may be further used, inter alia, in a system for broadcast monitoring. Broadcasts may be coded in advance with a watermark identifier. Monitoring television broadcasts with a system comprising a watermark detector 24 provides a mechanism for intellectual property protection and statistic data collection.

It should be noted that the above-mentioned embodiments illustrate rather than limit the invention. Those skilled in the art will be able to conceive alternative embodiments without departing from the scope of the appended claims.

In the claims, the word "comprising", and derivatives thereof, do not exclude the existence of elements or steps other than those defined in a claim. The invention may be implemented by separate elements and by a correctly programmed computer. In the claims relating to a product, in which several means, or components, are mentioned, several of these means may be implemented in one and the same piece of hardware.

In summary, a method of detecting a watermark embedded in a signal S is described, in which a plurality of frames $\{F_1, F_2, \ldots\}$ of the signal S is combined to a detection set $D_j$ for one detection event. According to the invention, the reliability of watermark detection is enhanced by using non-consecutive frames $\{F_i, F_{i+d}, \ldots\}$ to form a detection set $D_j$. The invention also relates to an apparatus for recording and/or playback of a signal, and to a system for broadcast monitoring, comprising such a watermark detector.

What is claimed is:

1. A method of detecting one or more watermarks embedded in a signal comprising consecutive frames, the method comprising:
    selecting a plurality of frames from the signal to form each detection set of a plurality of detection sets, and
    determining whether the one or more watermarks is embedded in the signal based on detecting a corresponding watermark in each of the detection sets,
    wherein
    at least one frame in each detection set is not immediately consecutive with any other frame in the detection set, and
    each detection set differs from each other detection set.

2. A method as claimed in claim 1, wherein
    each detection set includes a predetermined number of frames, and
    selecting the plurality of frames for each detection set includes selecting frames at a predetermined distance from each other.

3. A method as claimed in claim 2, wherein
    the predetermined number of frames and the predetermined distance are chosen to be such that their greatest common divisor equals one.

4. A method as claimed in claim 1, wherein
    the signal includes frames of images, and
    each detection set includes a predetermined number of frames,
    the method further including:
        dividing the consecutive frames in the signal into a plurality of series of a number of consecutive frames corresponding to each detection set, which number of consecutive frames in each series equals the number of frames in the detection set, and
    wherein
    selecting the plurality of frames for each detection set includes selecting a reference frame from each series, the reference frames in consecutive series being shifted by one position relative to a start of the series.

5. The method of claim 4, wherein
    the signal substantially corresponds to an MPEG-encoded signal, and
    the predetermined number of frames corresponds to a multiple of a GOP size of the MPEG-encoded signal.

6. A method as claimed in claim 1, further including:
    determining a composite measure of correlation based on a correlation between each of the frames of each detection set and a corresponding target watermark, and
    for at least one detection set, determining whether the corresponding target watermark is present in the at least one detection set based on the corresponding measure of correlation.

7. The method of claim 6, wherein
    selecting the plurality of frames for each detection set includes selecting equally spaced frames of the consecutive frames.

8. The method of claim 6, wherein
    the consecutive frames comprises MPEG-encoded I, B, and P frames, and
    selecting the plurality of frames for each detection set includes selecting a uniform distribution of the I, B, and P frames from the consecutive frames.

9. The method of claim 6, wherein
    selecting the plurality of frames for each detection set includes diagonal interleaving.

10. The method of claim 6, wherein
    selecting the plurality of frames for each detection set includes selecting from the consecutive frames based on a repetition of a set of spacing parameters.

11. The method of claim 6, further including:
    for at least one detection set, controlling access to the signal based on whether the corresponding target watermark is present in the at least one detection set.

12. The method of claim 1, wherein
    selecting the plurality of frames for each detection set includes selecting equally spaced frames of the consecutive frames.

13. The method of claim 1, wherein
    the consecutive frames comprise MPEG-encoded I, B, and P frames, and
    selecting the plurality of frames for each detection set includes selecting a uniform distribution of the I, B, and P frames from the consecutive frames.

14. The method of claim 1, wherein
selecting the plurality of frames for each detection set includes diagonal interleaving.

15. The method of claim 1, wherein
selecting the plurality of frames for each detection set includes selecting from the consecutive frames based on a repetition of a set of spacing parameters.

16. The method of claim 1, further including:
for at least one detection set, controlling access to the signal based on detecting the corresponding watermark in the at least one detection set.

17. A device for detecting one or more watermarks embedded in a signal, the device comprising:
a receiver that is configured to receive the signal; and
a combiner that is configured to combine a plurality of frames of the signal to form each detection set of a plurality of detection sets, and
a watermark detector that is configured to detect the one or more watermarks based on detecting a corresponding watermark in each detection set,
wherein
at least one frame of the plurality of frames that form each detection set is not consecutive in the signal with any other frame of the plurality of frames that form the detection set, and
each detection set differs from each other detection set.

18. An apparatus for recording and/or playback of a signal, comprising
a device as claimed in claim 17 for detecting a watermark embedded in the signal.

19. A system for monitoring a broadcast signal, comprising
a device as claimed in claim 17 for detecting a watermark embedded in the broadcast signal.

20. The device of claim 17, further including:
a switch, operably coupled to the watermark detector, that is configured to control access to the signal based on detecting the corresponding watermark in at least one detection set.

* * * * *